(12) United States Patent
Eguchi

(10) Patent No.: US 6,469,833 B2
(45) Date of Patent: Oct. 22, 2002

(54) ILLUMINATION OPTICAL SYSTEM AND AN ILLUMINATION LENS ELEMENT

(75) Inventor: Masaru Eguchi, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/817,052

(22) Filed: Mar. 27, 2001

(65) Prior Publication Data
US 2001/0036015 A1 Nov. 1, 2001

(30) Foreign Application Priority Data

Mar. 31, 2000  (JP) .................................. 2000-098518

(51) Int. Cl.[7] ............................. G02B 27/10; F21V 29/00
(52) U.S. Cl. ................................ 359/619; 362/268
(58) Field of Search ............................... 359/619, 626; 362/268, 522

(56) References Cited

U.S. PATENT DOCUMENTS

| 4,415,240 A | 11/1983 | Nishioka et al. ............. 385/33 |
| 4,610,513 A | 9/1986 | Nishioka et al. ............. 385/33 |
| 4,930,051 A * | 5/1990 | Golz ........................... 362/522 |
| 5,036,834 A | 8/1991 | Sugiyama et al. ......... 600/182 |
| 5,746,494 A | 5/1998 | Koeda et al. ............... 362/560 |
| 5,775,799 A * | 7/1998 | Forkner ..................... 362/268 |

FOREIGN PATENT DOCUMENTS

| JP | 63239415 | 10/1988 |
| JP | 7-43620 | 2/1995 |

* cited by examiner

Primary Examiner—Ricky Mack
(74) Attorney, Agent, or Firm—Greenblum & Bernstein, P.L.C.

(57) ABSTRACT

An illumination optical system includes a luminous body, and an illumination lens element through which light rays from said luminous body is diffused and emitted. The illumination lens element has peaks and troughs alternately provided on an incident surface or an exit surface thereof. A cross-sectional shape of the peaks and troughs is a curved surface defined by a periodic function which can be differentiated, or the peaks and troughs are formed by a plurality of straight lines approximating the curved surface.

11 Claims, 11 Drawing Sheets

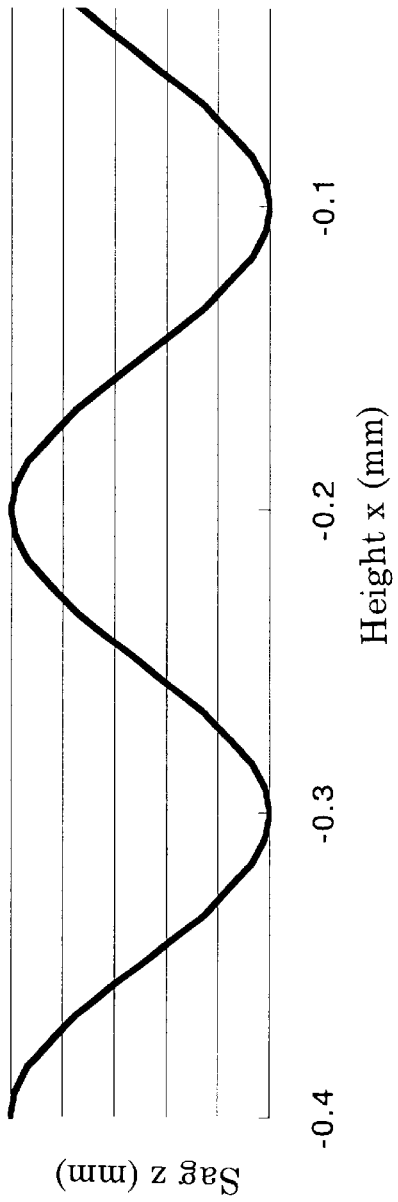
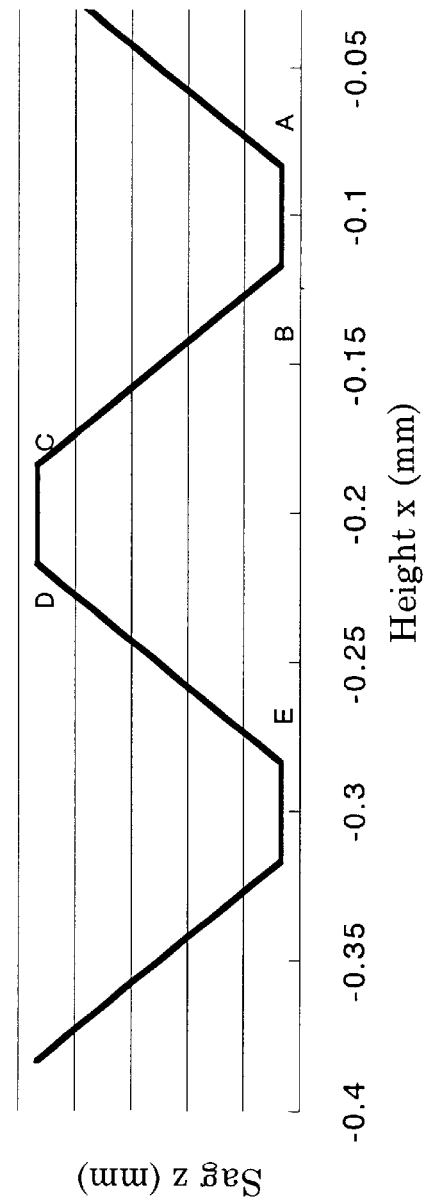
Fig.14
Fig.15 z=cos x $z = \cos\sqrt{(x^2+y^2)}$ $z = \cos x + \cos y$

ILLUMINATION OPTICAL SYSTEM AND AN ILLUMINATION LENS ELEMENT

BACKGROUND OF THE INVENTION

1. Field of the Invention

The present invention relates to an illumination optical system and an illumination lens element, and in particular, relates thereto suitable for an endoscope for illuminating an object through a fiber-optic lightguide.

2. Description of the Related Art

In an illumination optical system, e.g., in an illumination optical system for an endoscope, in which a directional bundle of light rays, emitted from a surface secondary light source (luminous body), such as a fiber-optic lightguide, is diffused through an illumination lens element, what should be considered is how to diffuse the directional bundle of light rays uniformly toward the periphery of an area to be illuminated so that a uniform light-quantity distribution is obtained.

In conventional illumination optical systems and illumination lens elements (a diffusion plate), various attempts have been made to improve the quality and performance thereof; however, no satisfactory results have been attained. In other words, an illumination lens element constituted by, for example, a planoconvex lens element with a spherical surface or an aspherical surface, or constituted by a negative meniscus lens element, cannot attain uniform illumination, nor avoid the occurrence of eclipse on the peripheral area of the lens element. Furthermore, an illumination optical system formed by a plurality of lens elements causes an increase of the entire length of the optical system. Accordingly, if the optical system is applied to an endoscope, such a lengthy optical system causes adverse influence to the bending-operability of the endoscope. Still further, such a lengthy endoscope with a lot of lens elements causes a production cost increase.

In connection with the above, for example, Japanese Unexamined Patent Publication No. Hei-7-43620 has taught an illumination lens element having a surface formed like saw teeth; however, through such a serrated surface, the directions of light rays tend to be uniform, so that sufficient diffusion cannot be attained.

SUMMARY OF THE INVENTION

It is an object of the present invention to provide an illumination optical system and an illumination lens element, by which a bundle of light rays emitted from a luminous body is uniformly diffused so that a uniform light-quantity distribution is obtained.

The present invention is directed to an illumination optical system including a luminous body and an illumination lens element which diffuses light rays emitted from the luminous body, and is directed to the illumination lens element itself.

More concretely, in order to achieve the above-mentioned object, the illumination lens element has a rippled surface, constituted by peaks and troughs which are alternately provided, on at least one of the incident surface and the exit surface thereof. The rippled surface is formed as a curved surface whose cross-sectional shape is defined by a periodic function which can be differentiated, or is formed by a plurality of straight lines which approximate the above curved surface which can be differentiated.

In the case where the cross-sectional shape of the rippled surface, i.e., the peaks and troughs, formed on one of the incident surface and the exit surface is a periodic function which can be differentiated, there are countless tangential directions in an area along a predetermined direction. As a result, a bundle of light rays emitted from the exit surface can be uniformly diffused, so that a more uniform light-quantity distribution (characteristics of luminous intensity distribution) can be obtained. The reason why a shape formed by a plurality of straight lines approximating the curved surface which can be differentiated is referred to is that the manufacturing of the illumination lens element is considered. In other words, the rippled surface can be defined by a periodic function at the design stage; however, in the production stage, curved lines defined by the periodic function can be practically replaced with a lot of straight lines when data on the rippled surface is input to machinery.

The illumination lens element can be formed rotationally symmetrical with respect to an axis parallel with the center axis of a bundle of fibers (hereinafter, the optical axis). The above explained rippled surface is formed by a single periodic function; however, it is also possible to form the same by the combination of plural periodic functions.

The features of the present invention can be described as follows: the above explained peaks and troughs which are alternately provided are formed so that at least three or more tangential directions exist in one period of the function. In other words, the three or more tangential directions mean that the randomness of the directions of light rays being emitted from the illumination lens element can be increased. Accordingly, a more uniform light-quantity distribution (characteristics of luminous intensity distribution) can be expected.

The peaks and troughs formed on the illumination lens element can be described as follows:

(i) at least one of the incident surface and the exit surface is provided with the peaks and troughs which are alternately provided thereon;

(ii) in the case where an angle, formed by a tangential line with respect to any point on the peaks-and-troughs surface and an imaginary line orthogonal to the optical axis, is defined as an inclination angle, the inclination angle is to be distributed over a range from 0° to ±60° or more; and (iii) when the peaks-and-troughs surface for one period is equidistantly divided by sufficient numbers of divisional points, a relation in which the larger the inclination angle is the more divisional points exist is established. In addition to the above, when the peaks and troughs are made periodic, there is an advantage, i.e., by varying the diameter of the illumination lens element, the same characteristics of luminous intensity distribution can be obtained with respect to the lightguides having different diameters.

As explained, the peaks and troughs are formed in a manner that the larger the inclination angle is the more divisional points exist, under the condition that the peaks-and-troughs surface for one period is equidistantly divided by sufficient numbers of divisional points. This is generally understood that the randomness of the directions of light rays emitted from the illumination lens element can be increased. Accordingly, a more uniform characteristics of luminous intensity distribution can be expected.

The illumination optical system and the illumination lens element according to the present invention, which are preferably used for a fiber-optic lightguide for transmitting light rays from a light source, can also be used for other purposes.

The present disclosure relates to subject matter contained in Japanese Patent Application No.2000-98518 (filed on Mar. 31, 2000) which is expressly incorporated herein by reference in its entirety.

BRIEF DESCRIPTION OF THE DRAWINGS

The invention will be discussed below in detail with reference to the accompanying drawings, in which:

FIG. 14 is a cross-sectional view for the 2 (two) periods of the illumination lens element of a fifth embodiment;

FIG. 15 is a cross-sectional view for the 2 (two) periods of the illumination lens element of a sixth embodiment;

DESCRIPTION OF THE PREFERRED EMBODIMENTS

Figure 1:
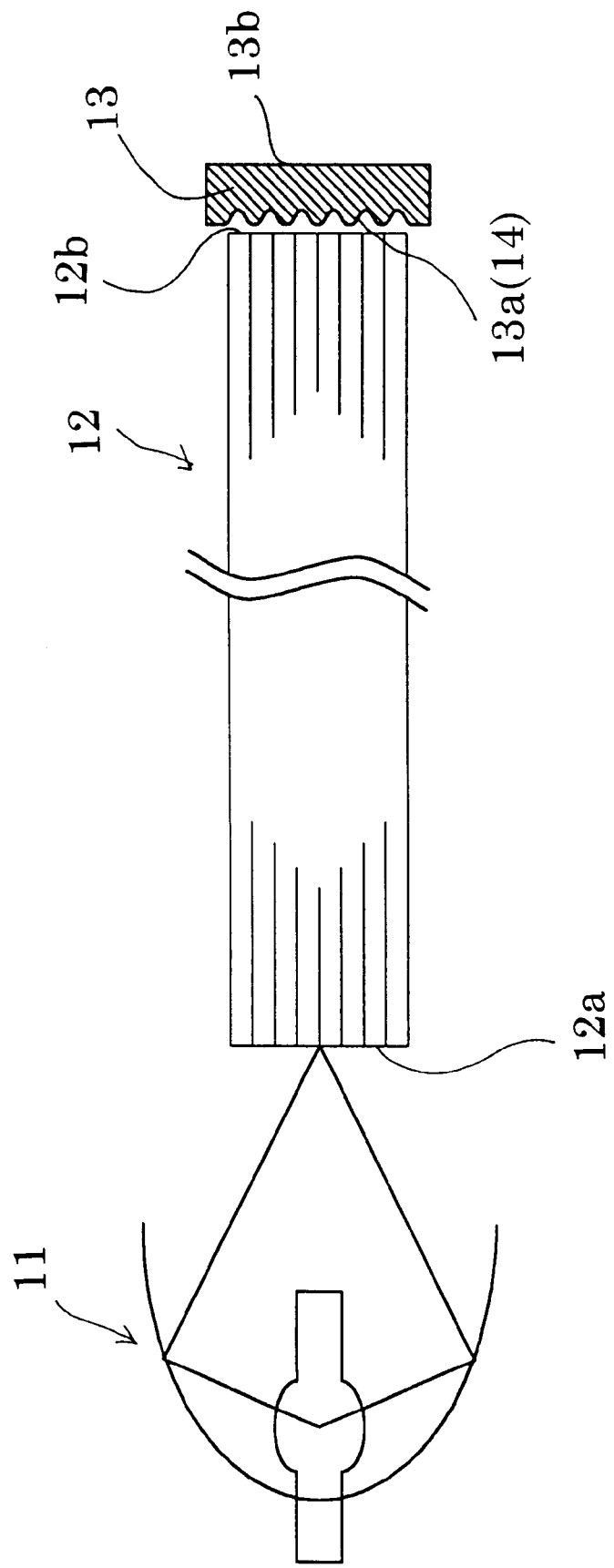
FIG. 1 shows an optical diagram of an embodiment of an illumination optical system according to the present invention.

FIG. 1 shows an embodiment applied to an illumination optical system for an endoscope. A bundle of light rays emitted from a light source 11 positioned outside the body cavity of a patient is made incident on an incident-end surface 12a of a fiber-optic lightguide 12. The fiber-optic lightguide 12 extends through the body insertion portion of the endoscope, and is led to the top-end portion thereof. At the top-end of the endoscope, an illumination lens element 13 is fixed thereto, and an exit-end surface 12b of the fiber-optic lightguide 12 is arranged to face the illumination lens element 13. The exit-end surface 12b is lit by the bundle of light rays emitted from the light source 11 so that the exit-end surface 12b functions as a luminous body (secondary light source). A bundle of light rays from the luminous body is diffused by the illumination lens element 13, and emitted therefrom.

In such an illumination optical system of an endoscope, the light-quantity distribution at the incident-end surface 12a is generally uneven. Since a bundle of light rays with uneven distribution is transmitted to the exit-end surface 12b, various proposals have been made to increase the evenness of light distribution at the incident-end surface 12a. On the other hand, this embodiment is to provide the illumination lens element 13 which can attain a more preferable light-quantity distribution (characteristics of luminous intensity distribution) without relying on the light distribution at the incident-end surface 12a or at the exit-end surface 12b.

Figure 2:
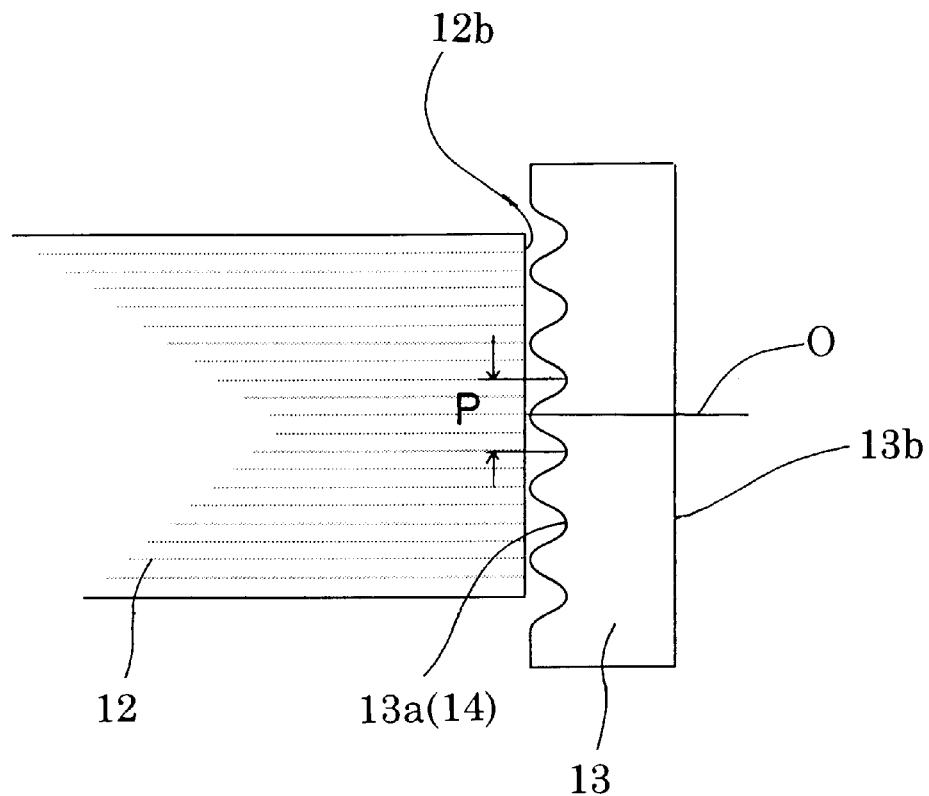
FIG. 2 is an enlarged cross-sectional view of an illumination lens element of the illumination optical system shown in FIG. 1.

FIG. 2 is an enlarged cross-sectional view of the illumination lens element 13. The illumination lens element 13 includes an incident surface 13a and an exit surface 13b. The incident surface 13a faces the exit-end surface 12b of the fiber-optic lightguide 12, and is provided with a rippled surface thereon constituted by peaks and troughs 14.

Figure 3A:
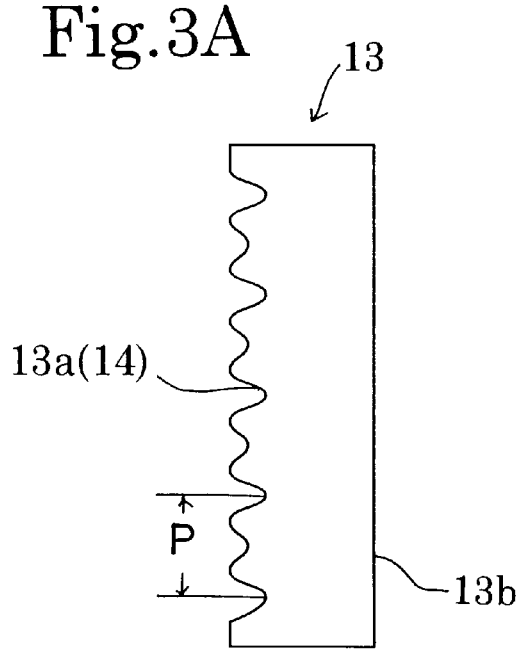
FIGS. 3A and 3B are cross-sectional views of the illumination lens elements having the surfaces defined by the combination of a plurality of periodic functions.
Figure 3B:
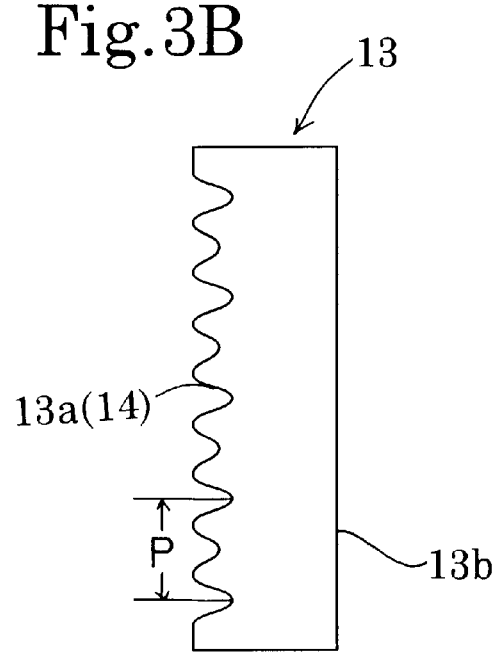

In this embodiment, the peaks and troughs 14 is formed rotationally symmetrical with respect to the optical axis O, and the cross-sectional shape of the peaks and troughs 14 is defined by a periodic function which can be differentiated. FIGS. 3A and 3B are cross-sectional views of the peaks and troughs 14 defined by the combination of a plurality of periodic functions. In other words, there are a plurality of different periodic functions in one period. In the case where the cross-sectional shape of the peaks and troughs 14 is such a plurality of periodic functions, there are countless tangential directions in one period P. Due to this arrangement, light rays incident on the incident surface 13a of the illumination lens element 13 are deflected in various directions, thereby the light distribution of light rays emitted from the exit surface 13b can be made uniform.

Figure 4:
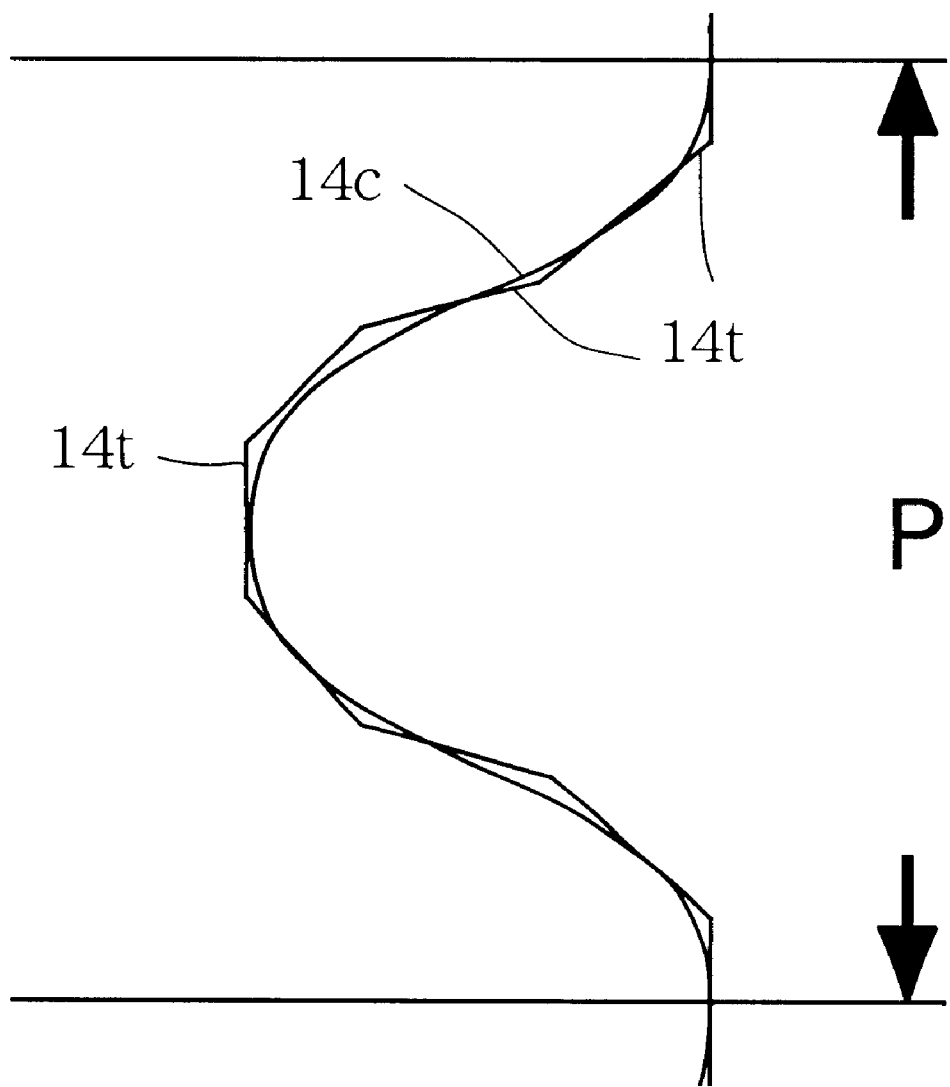
FIG. 4 shows an example in which a shape defined by a periodic function is approximated by a plurality of straight lines.

FIG. 4 shows one period of a curved line 14c of a periodic function which can be differentiated, and a group of straight lines 14t (a plurality of straight lines) which approximate the curved line 14c.

According to another embodiment, the cross-sectional shape of the peaks and troughs 14 can be formed so that at least three or more tangential directions exist; however, the cross-sectional shape thereof is not necessarily formed as a periodic function. On the other hand, if an attempt is made to shorten an individual length of the straight lines 14t so that at least three or more tangential directions are obtained, the randomness of the directions of light rays emitted from the illumination lens element 13 can also be increased.

Figure 5:
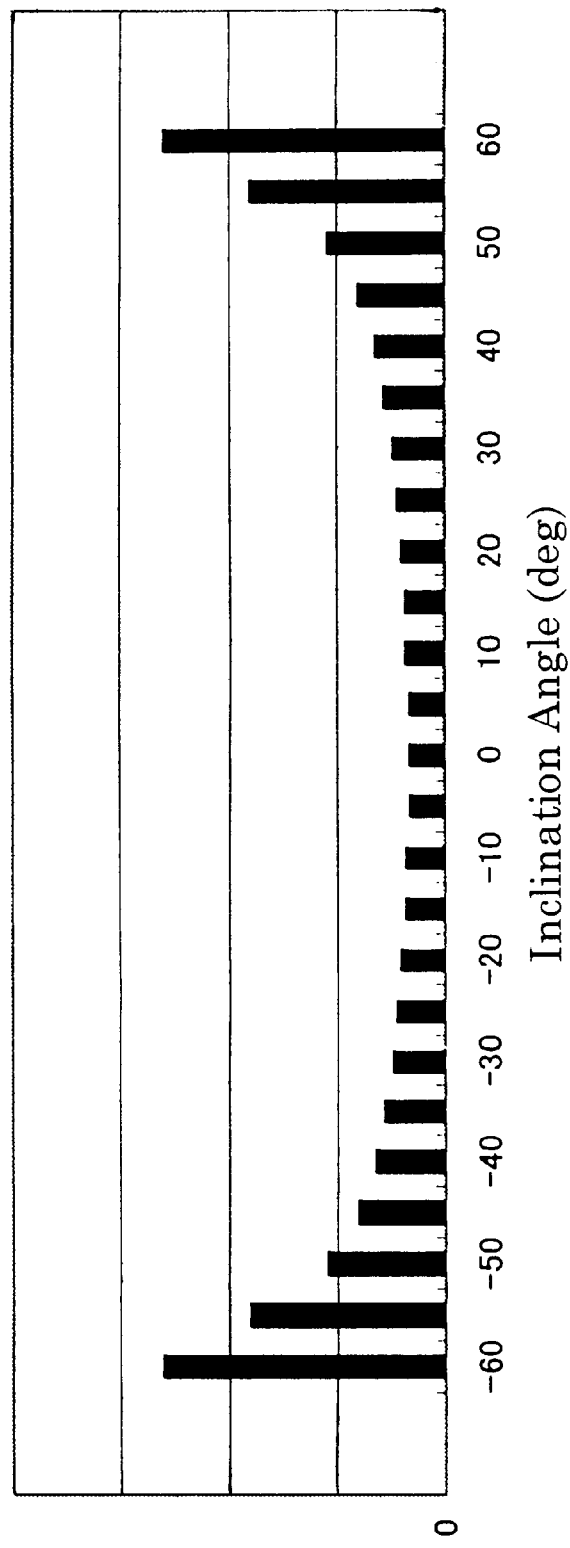
FIG. 5 is a histogram in accordance with the number of divisional points per inclination angle.

FIG. 5 is another way to define the peaks and troughs 14 formed on the incident surface 13a or the exit surface 13b of the illumination lens element 13. More concretely, in FIG. 5, an inclination angle formed by a tangential line with respect to any point on the peaks-and-troughs surface and an imaginary line orthogonal to the optical axis is shown along the abscissa, and the divisional points (occurrences of tangential directions) are shown along the ordinate. The peaks-and-troughs surface can be obtained, for example, according to the following:

(i) dividing one period of the peaks and troughs 14 by predetermined finite numbers of divisional points in a direction orthogonal to the optical axis;

(ii) an inclination angle is measured at each divisional point; and (iii) a tangential line is plotted per inclination angle.

The inclination angle is distributed over a range from 0° to ±60° or more. The peaks and troughs 14 are formed so that the larger the inclination angle is, the more divisional points exist. According to the above-explained peaks and troughs 14, light rays incident on the incident surface 13a of the illumination lens element 13 are deflected in various directions, thereby the light distribution of light rays emitted from the exit surface 13b can be made uniform. Further, in this embodiment of FIG. 5, when the peaks and troughs 14 are made periodic, there is an advantage, i.e., by varying the diameter of the illumination lens element 13, the same characteristics of luminous intensity distribution can be obtained with respect to the fiber-optic lightguides 12 having different diameters.

Embodiments will be herein discussed. The cross-sectional shapes of the following first through fourth embodiments are defined by the following periodic function:

$$z = A \cos(2\pi x/t) + B.$$

In each embodiment, A and B are commonly used, and $A=0.05$, $B=0.05$, and the value of t differs.

[First Embodiment]

Figure 6:
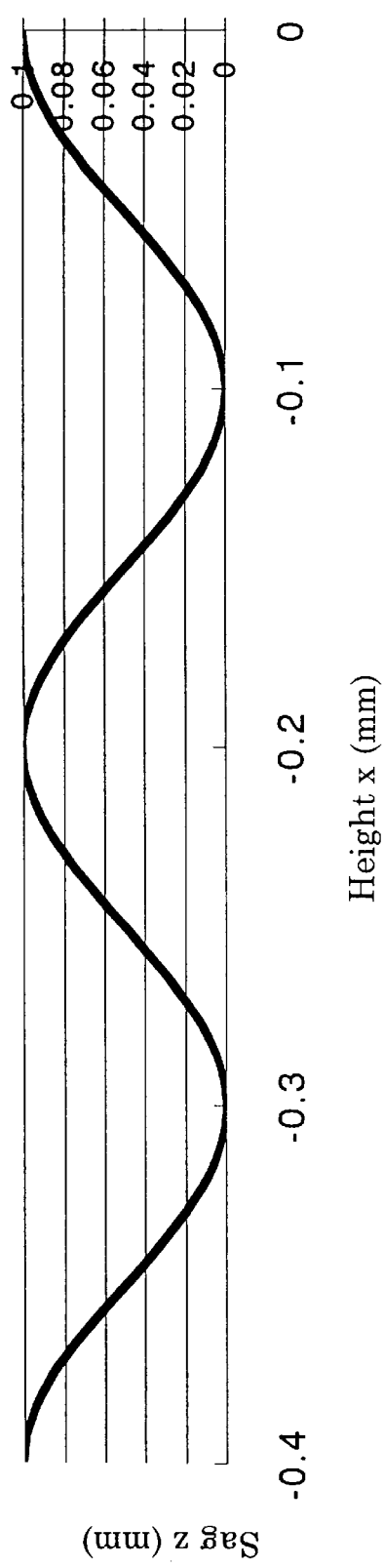
FIG. 6 is a cross-sectional view for the two periods of the illumination lens element of a first embodiment.

FIG. 6 is a cross-sectional view for the two periods of the illumination lens element 13 of the first embodiment.

Figure 7:
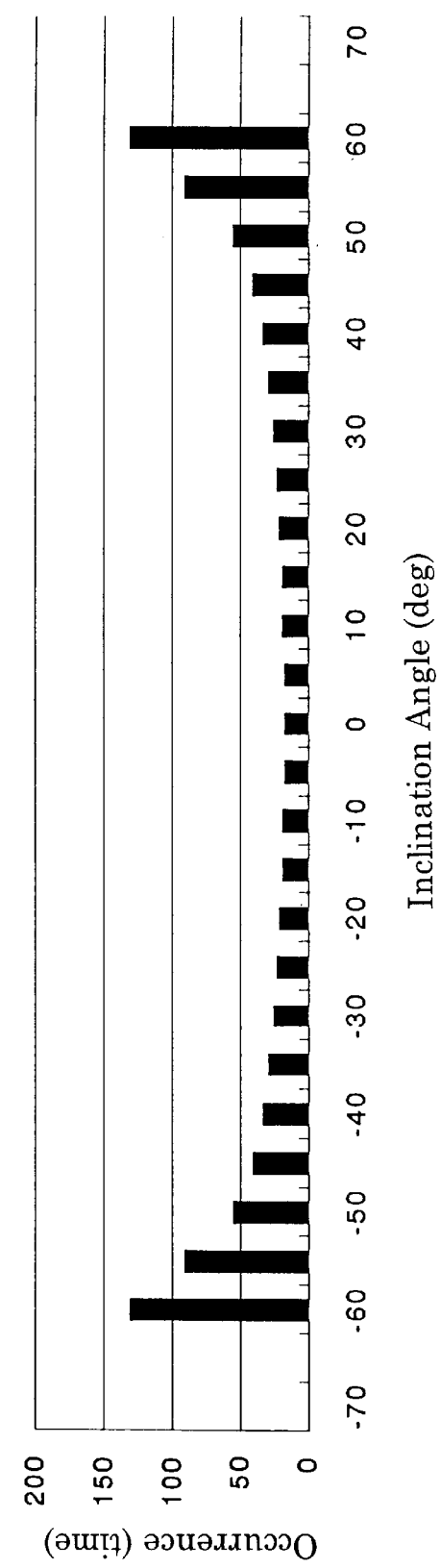
FIG. 7 is a histogram for the illumination lens element of the first embodiment, in accordance with the number of divisional points per inclination angle under the condition that the peaks-and-troughs surface for one period is divided by 1000 divisional points.

FIG. 7 is a histogram for the illumination lens element, in accordance with the number of divisional points per inclination angle under the condition that the peaks-and-troughs surface for one period is divided by 1000 divisional points.

The value of t is as follows:

$$t = (16/4) * A = 0.2$$

[Second Embodiment]

Figure 8:
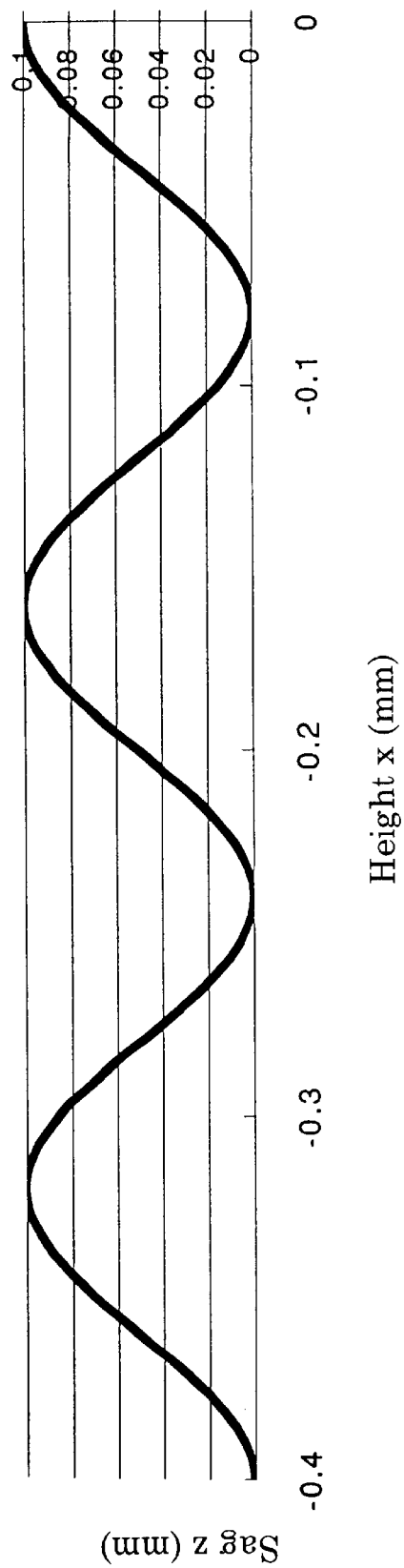
FIG. 8 is a cross-sectional view for the 2.5 (two point five) periods of the illumination lens element of a second embodiment.

FIG. 8 is across-sectional view for the 2.5 (two point five) periods of the illumination lens element 13 of the second embodiment.

Figure 9:
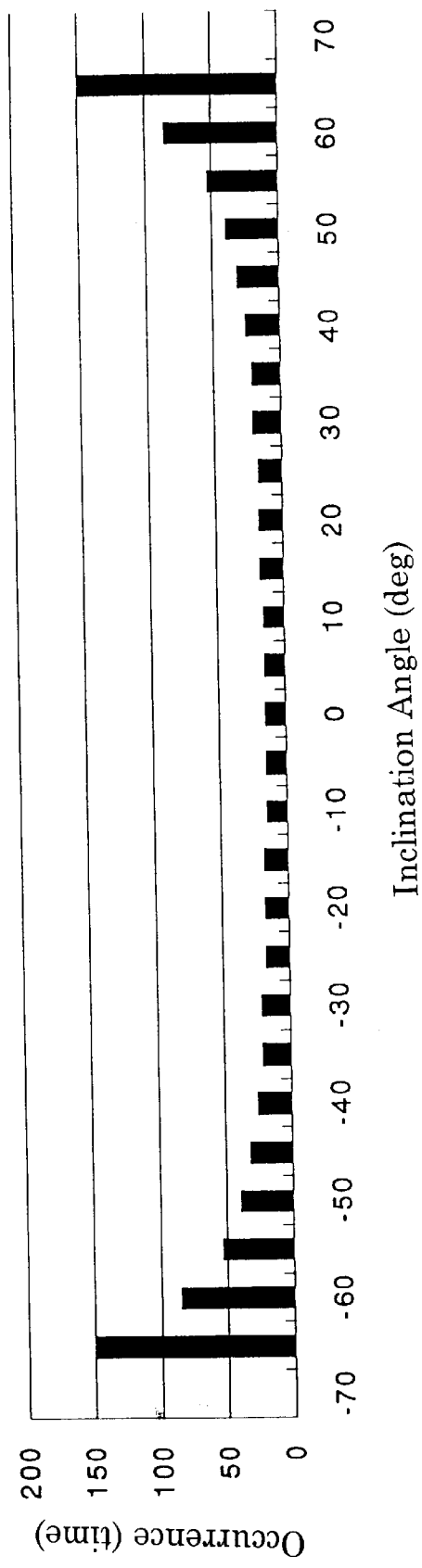
FIG. 9 is a histogram for the illumination lens element of the second embodiment, in accordance with the number of divisional points per inclination angle, under the condition that the peaks-and-troughs surface for one period is divided by 1000 divisional points.

FIG. 9 is a histogram for the illumination lens element, in accordance with the number of divisional points per inclination angle, under the condition that the peaks-and-troughs surface for one period is divided by 1000 divisional points.

The value of t is as follows:

$$t = (16/5) * A = 0.16$$

[Third Embodiment]

Figure 10:
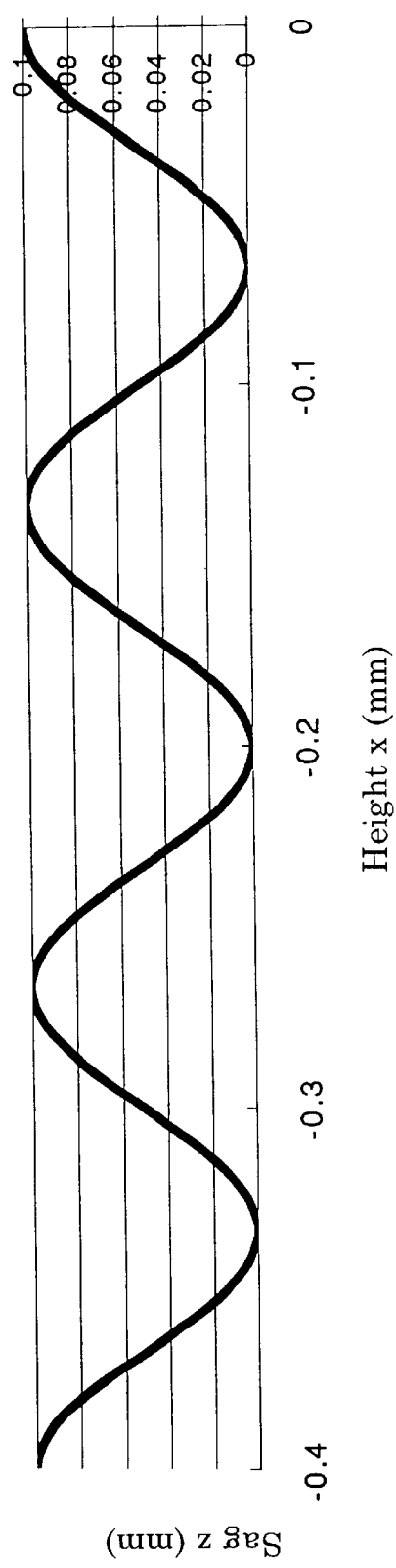
FIG. 10 is a cross-sectional view for the 3 (three) periods of the illumination lens element of a third embodiment.

FIG. 10 is a cross-sectional view for the 3 (three) periods of the illumination lens element 13 of the third embodiment.

Figure 11:
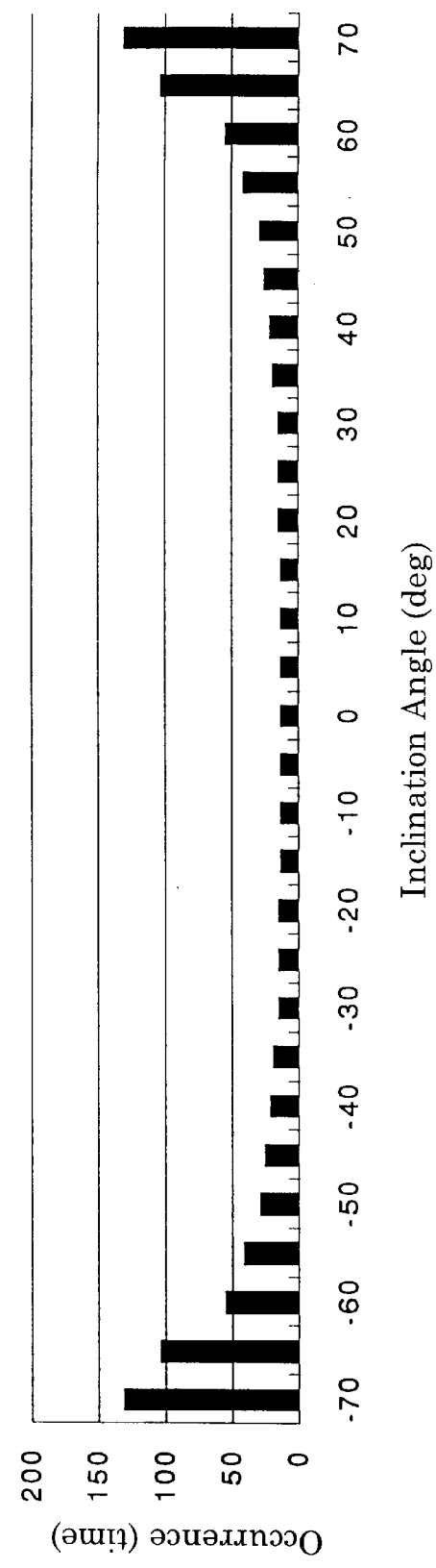
FIG. 11 is a histogram for the illumination lens element of the third embodiment, in accordance with the number of divisional points per inclination angle within one period of the peaks-and-troughs surface.

FIG. 11 is a histogram for the illumination lens element, in accordance with the number of divisional points per inclination angle within one period of the peaks-and-troughs surface.

The representing coordinate of this cross-sectional shape is shown in Table 3.

The value of t is as follows:

$$t = (16/6) * A = 0.13$$

[Fourth Embodiment]

Figure 12:
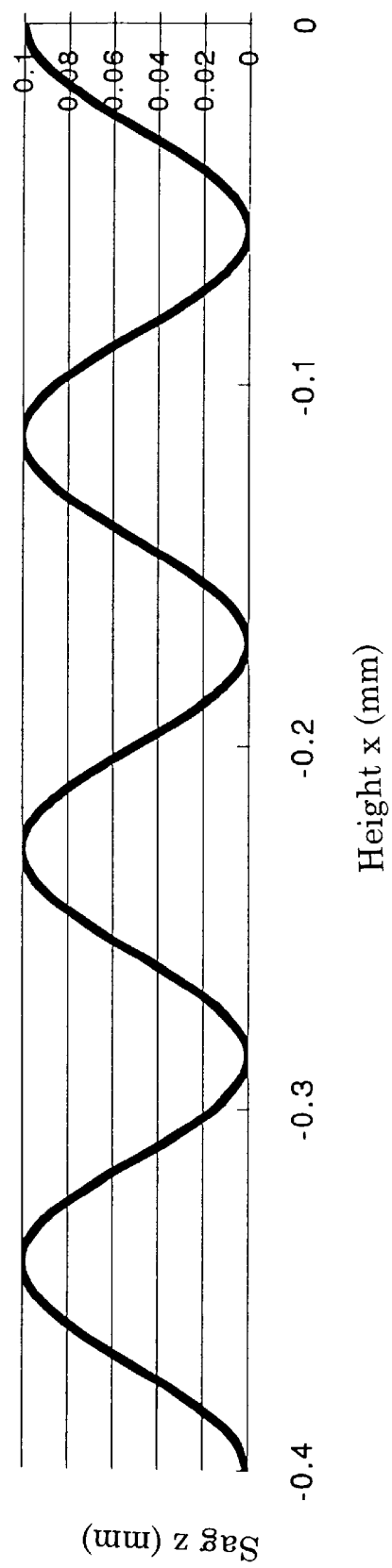
FIG. 12 is a cross-sectional view for the 3.5 (three point five) periods of the illumination lens element of a fourth embodiment.

FIG. 12 is a cross-sectional view for the 3.5 (three point five) periods of the illumination lens element 13 of the fourth embodiment.

Figure 13:
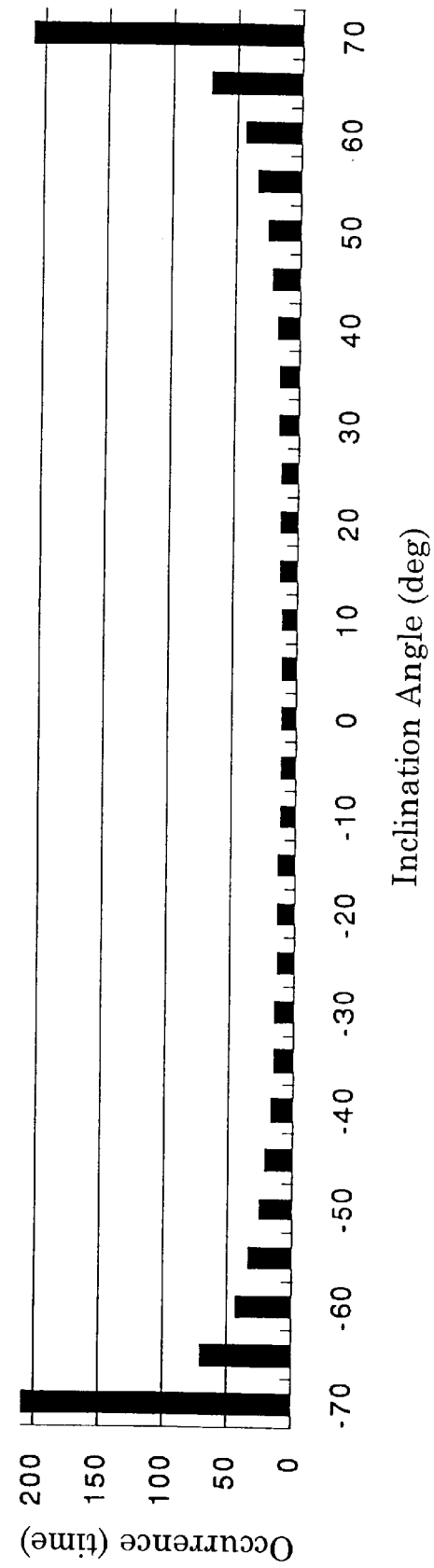
FIG. 13 is a histogram for the illumination lens element of the fourth embodiment, in accordance with the number of divisional points per inclination angle within one period of the peaks-and-troughs surface.

FIG. 13 is a histogram for the illumination lens element, in accordance with the number of divisional points per inclination angle within one period of the peaks-and-troughs surface.

The value of t is as follows:

$$t = (16/7) * A = 0.11$$

Table 1 shows coordinates which represent the cross-sectional shapes of the illumination lens element 13 in the first through fourth embodiments.

In Table 1, x designates a distance parameter in a direction orthogonal to the optical axis O for defining the periodic function of each embodiment; and z (sag) designates the distance, in the optical axis direction, from a tangent plane (orthogonal to the optical axis O) at an appropriate peak of the periodic function to the lens surface.

Table 2 shows the divisional points (occurrences of tangential directions) per inclination angle, in the case where one period of the cross-sectional shape of the illumination lens element 13 of each embodiment shown in Table 1 is divided by thousand divisional points.

TABLE 1

| x (mm) | Embodiment 1 Sag z (mm) | Embodiment 2 Sag z (mm) | Embodiment 3 Sag z (mm) | Embodiment 4 Sag z (mm) |
|---|---|---|---|---|
| 0.000 | 0.1000 | 0.1000 | 0.1000 | 0.1000 |
| −0.008 | 0.0983 | 0.0973 | 0.0962 | 0.0948 |
| −0.017 | 0.0933 | 0.0897 | 0.0854 | 0.0804 |
| −0.025 | 0.0854 | 0.0778 | 0.0691 | 0.0598 |
| −0.033 | 0.0750 | 0.0629 | 0.0500 | 0.0371 |
| −0.042 | 0.0629 | 0.0467 | 0.0309 | 0.0170 |
| −0.050 | 0.0500 | 0.0309 | 0.0146 | 0.0038 |
| −0.058 | 0.0371 | 0.0170 | 0.0038 | 0.0001 |
| −0.067 | 0.0250 | 0.0067 | 0.0000 | 0.0067 |
| −0.075 | 0.0146 | 0.0010 | 0.0038 | 0.0222 |
| −0.083 | 0.0067 | 0.0004 | 0.0146 | 0.0435 |
| −0.092 | 0.0017 | 0.0052 | 0.0309 | 0.0661 |
| −0.100 | 0.0000 | 0.0146 | 0.0500 | 0.0854 |
| −0.108 | 0.0017 | 0.0279 | 0.0691 | 0.0973 |
| −0.117 | 0.0067 | 0.0435 | 0.0854 | 0.0996 |
| −0.125 | 0.0146 | 0.0598 | 0.0962 | 0.0916 |
| −0.133 | 0.0250 | 0.0750 | 0.1000 | 0.0750 |
| −0.142 | 0.0371 | 0.0876 | 0.0962 | 0.0533 |
| −0.150 | 0.0500 | 0.0962 | 0.0854 | 0.0309 |
| −0.158 | 0.0629 | 0.0999 | 0.0691 | 0.0124 |
| −0.167 | 0.0750 | 0.0983 | 0.0500 | 0.0017 |
| −0.175 | 0.0854 | 0.0916 | 0.0309 | 0.0010 |
| −0.183 | 0.0933 | 0.0804 | 0.0146 | 0.0103 |
| −0.192 | 0.0983 | 0.0661 | 0.0038 | 0.0279 |
| −0.200 | 0.1000 | 0.0500 | 0.0000 | 0.0500 |
| −0.208 | 0.0983 | 0.0339 | 0.0038 | 0.0721 |
| −0.217 | 0.0933 | 0.0196 | 0.0146 | 0.0897 |
| −0.225 | 0.0854 | 0.0084 | 0.0309 | 0.0990 |
| −0.233 | 0.0750 | 0.0017 | 0.0500 | 0.0983 |
| −0.242 | 0.0629 | 0.0001 | 0.0691 | 0.0876 |
| −0.250 | 0.0500 | 0.0038 | 0.0854 | 0.0691 |
| −0.258 | 0.0371 | 0.0124 | 0.0962 | 0.0467 |
| −0.267 | 0.0250 | 0.0250 | 0.1000 | 0.0250 |
| −0.275 | 0.0146 | 0.0402 | 0.0962 | 0.0084 |
| −0.283 | 0.0067 | 0.0565 | 0.0854 | 0.0004 |
| −0.292 | 0.0017 | 0.0721 | 0.0691 | 0.0027 |
| −0.300 | 0.0000 | 0.0854 | 0.0500 | 0.0146 |
| −0.308 | 0.0017 | 0.0948 | 0.0309 | 0.0339 |
| −0.317 | 0.0067 | 0.0996 | 0.0146 | 0.0565 |
| −0.325 | 0.0146 | 0.0990 | 0.0038 | 0.0778 |
| −0.333 | 0.0250 | 0.0933 | 0.0000 | 0.0933 |
| −0.342 | 0.0371 | 0.0830 | 0.0038 | 0.0999 |
| −0.350 | 0.0500 | 0.0691 | 0.0146 | 0.0962 |

TABLE 1-continued

| x (mm) | Embodiment 1 Sag z (mm) | Embodiment 2 Sag z (mm) | Embodiment 3 Sag z (mm) | Embodiment 4 Sag z (mm) |
| --- | --- | --- | --- | --- |
| −0.358 | 0.0629 | 0.0533 | 0.0309 | 0.0830 |
| −0.367 | 0.0750 | 0.0371 | 0.0500 | 0.0629 |
| −0.375 | 0.0854 | 0.0222 | 0.0691 | 0.0402 |
| −0.383 | 0.0933 | 0.0103 | 0.0854 | 0.0196 |
| −0.392 | 0.0983 | 0.0027 | 0.0962 | 0.0052 |
| −0.400 | 0.1000 | 0.0000 | 0.1000 | 0.0000 |

TABLE 2

| Angle | Embodiment 1 | Embodiment 2 | Embodiment 3 | Embodiment 4 |
| --- | --- | --- | --- | --- |
| −70 |  |  | 130 | 208 |
| −65 |  | 149 | 102 | 69 |
| −60 | 130 | 84 | 54 | 42 |
| −55 | 90 | 52 | 40 | 32 |
| −50 | 54 | 38 | 28 | 24 |
| −45 | 40 | 30 | 24 | 20 |
| −40 | 32 | 24 | 20 | 16 |
| −35 | 28 | 20 | 18 | 14 |
| −30 | 24 | 20 | 14 | 14 |
| −25 | 22 | 16 | 14 | 12 |
| −20 | 20 | 16 | 14 | 12 |
| −15 | 18 | 16 | 12 | 12 |
| −10 | 18 | 14 | 12 | 10 |
| −5 | 16 | 14 | 12 | 10 |
| 0 | 16 | 14 | 12 | 10 |
| 5 | 16 | 14 | 12 | 10 |
| 10 | 18 | 14 | 12 | 10 |
| 15 | 18 | 16 | 12 | 12 |
| 20 | 20 | 16 | 14 | 12 |
| 25 | 22 | 16 | 14 | 12 |
| 30 | 24 | 20 | 14 | 14 |
| 35 | 28 | 20 | 18 | 14 |
| 40 | 32 | 24 | 20 | 16 |
| 45 | 40 | 30 | 24 | 20 |
| 50 | 54 | 38 | 28 | 24 |
| 55 | 90 | 52 | 40 | 32 |
| 60 | 130 | 84 | 54 | 42 |
| 65 |  | 149 | 102 | 69 |
| 70 |  |  | 130 | 208 |

[Fifth Embodiment]

FIG. 14 is a cross-sectional shape for the 2 (two) periods of the illumination lens element 13 of the fifth embodiment. In this embodiment, the cross-sectional shape of the first embodiment is approximated by a lot of straight lines, and more concretely, the shape is formed by connecting the coordinates points show in Table 3. According to this embodiment, in an area (near the peaks or troughs) where the change in an inclination angel (inclination of the tangential line) is sharp, the number of divisions for the straight lines 14t to form an individual straight lines is increased (approximation by a larger number of straight lines). On the other hand, in an area (other than near the peaks or troughs) where the change in an inclination angel is gradual, the number divisions for the straight lines 14t to form an individual straight lines is decreased (approximation by a smaller number of straight lines).

TABLE 3

| x (mm) | Sag z (mm) |
| --- | --- |
| 0.000 | 0.1000 |
| −0.001 | 0.1000 |
| −0.008 | 0.0983 |

TABLE 3-continued

| x (mm) | Sag z (mm) |
| --- | --- |
| −0.017 | 0.0933 |
| −0.033 | 0.0750 |
| −0.067 | 0.0250 |
| −0.083 | 0.0067 |
| −0.092 | 0.0017 |
| −0.099 | 0.0000 |
| −0.100 | 0.0000 |
| −0.101 | 0.0000 |
| −0.108 | 0.0017 |
| −0.117 | 0.0067 |
| −0.133 | 0.0250 |
| −0.167 | 0.0750 |
| −0.183 | 0.0933 |
| −0.192 | 0.0983 |
| −0.199 | 0.1000 |
| −0.200 | 0.1000 |
| −0.201 | 0.1000 |
| −0.208 | 0.0983 |
| −0.217 | 0.0933 |
| −0.233 | 0.0750 |
| −0.267 | 0.0250 |
| −0.283 | 0.0067 |
| −0.292 | 0.0017 |
| −0.299 | 0.0000 |
| −0.300 | 0.0000 |
| −0.301 | 0.0000 |
| −0.308 | 0.0017 |
| −0.317 | 0.0067 |
| −0.333 | 0.0250 |
| −0.367 | 0.0750 |
| −0.383 | 0.0933 |
| −0.392 | 0.0983 |
| −0.399 | 0.1000 |
| −0.400 | 0.1000 |

[Embodiment 6]

FIG. 15 is a cross-sectional shape for the 2 (two) periods of the illumination lens element 13 of the sixth embodiment. In this cross-sectional shape, there are only three tangential directions. The cross-sectional shape is formed by connecting he coordinates points show in Table 4.

TABLE 4

| x (mm) | Sag z (mm) |
| --- | --- |
| −0.0167 | 0.0933 |
| −0.0833 | 0.0067 |
| −0.1167 | 0.0067 |
| −0.1833 | 0.0933 |
| −0.2167 | 0.0933 |
| −0.2833 | 0.0067 |
| −0.3167 | 0.0067 |
| −0.3833 | 0.0933 |

Figure 16:
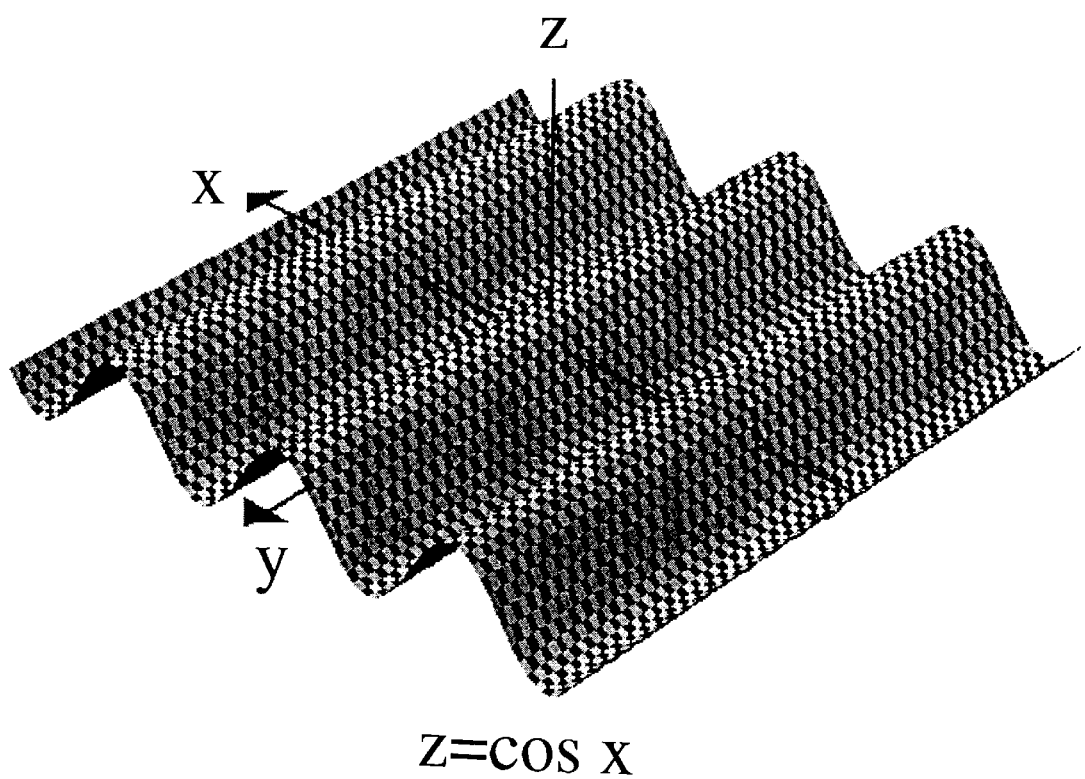
FIG. 16 is another embodiment showing a perspective view of a curved surface, defined by the periodic function z=cos x, extended in the y-axis direction.
Figure 17:
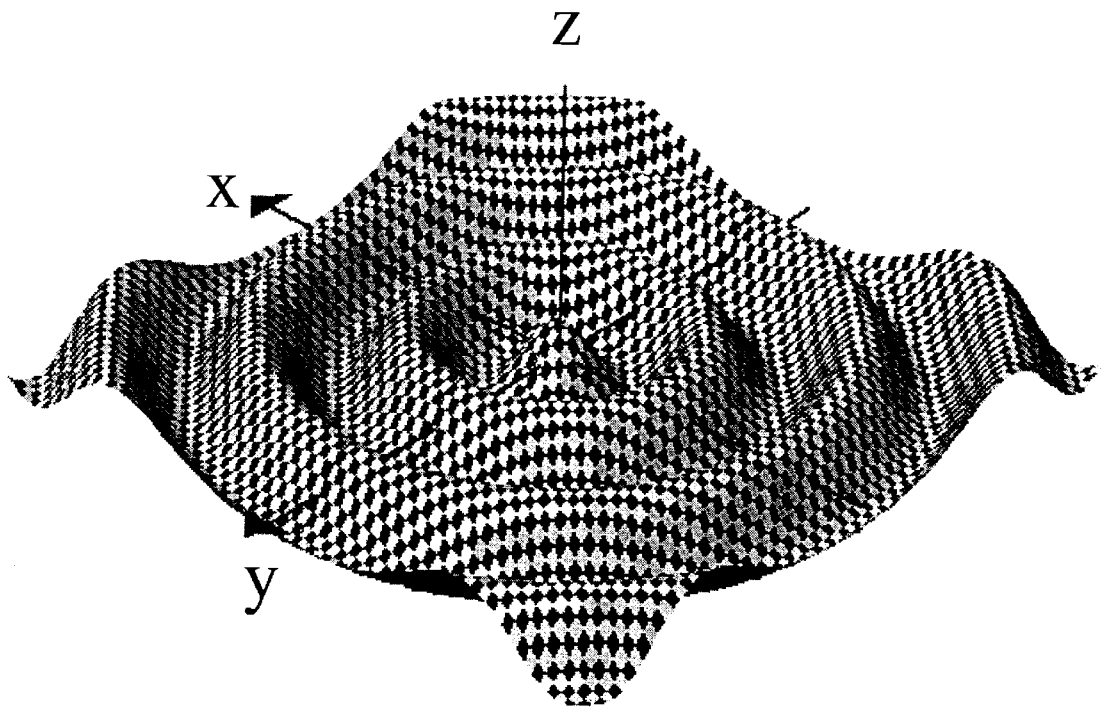
FIG. 17 is still another embodiment showing a perspective view of a curved surface defined by $z=\cos(x^2+y^2)^{1/2}$.
Figure 18:
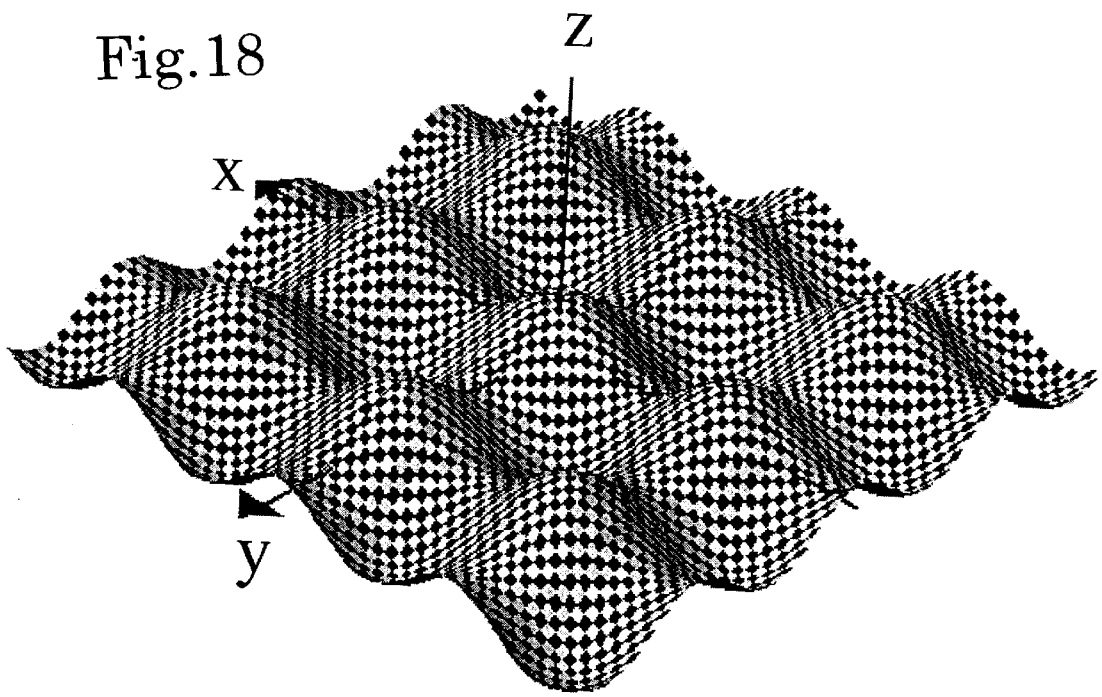
FIG. 18 is a further embodiment showing a perspective view of a curved surface defined by z=cos x+cos y.

In each above described embodiment, the rippled surface, constituted by the peaks and troughs 14, of the illumination lens 13 is explained as a cross-sectional shape; however, not limited the above, the rippled surface 14 can be formed by any one of other embodiments shown in FIGS. 16 through 18. FIG. 16 is another embodiments showing a perspective view of a curved surface, defined by the periodic function z=cos x, extended in the y-axis direction. FIG. 17 is a still another embodiment showing a perspective view of a curved surface defined by z=cos $(x^2+y^2)^{1/2}$. FIG. 18 is a further embodiment showing a perspective view of a curved surface defined by z=cos x+cos y.

According to the above description, an illumination optical system and an illumination lens element, by which a more uniform light-quantity distribution is attained, can be obtained at a low production cost.

What is claimed is:

1. An illumination optical system comprising;

a luminous body; and an illumination lens element through which light rays from said luminous body are diffused and emitted, wherein said illumination lens element comprises peaks and troughs which are alternately provided on at least one of an incident surface and an exit surface of said illumination lens element;

wherein a cross-sectional shape of said peaks and troughs comprises a curved surface defined by a periodic function which is able to be differentiated, or said peaks and troughs are formed by a plurality of straight lines approximating said curved surface which is able to be differentiated; and wherein said peaks and troughs are rotationally symmetrical with respect to an axis parallel with an optical axis of said illumination lens element.

2. The illumination optical system according to claim 1, wherein said luminous body comprises an exit-end surface of a fiber-optic lightguide for transmitting light rays from a light source.

3. The illumination optical system according to claim 1, wherein said periodic function is a combination of a plurality of periodic functions.

4. An illumination optical system comprising;

a luminous body; and an illumination lens element through which light rays from said luminous body are diffused and emitted, wherein said illumination lens element comprises periodic peaks and troughs which are provided on at least one of an incident surface and a exit surface of said illuminous lens element;

wherein said peaks and troughs are formed so that at least three or more tangential directions exist in one period; and wherein said peaks and troughs are rotationally symmetrical with respect to an axis parallel with an optical axis of said illumination lens element.

5. The illumination optical system according to claim 4, wherein said luminous body comprises an exit-end surface of a fiber-optic lightguide for transmitting light rays from a light source.

6. An illumination optical system comprising:

a luminous body; and an illumination lens element through which light rays from said luminous body are diffused and emitted, wherein said illumination lens element comprises peaks and troughs which are alternately provided on at least one of an incident surface and an exit surface of said illumination lens element;

wherein, when an angle, formed by a tangential line with respect to said peaks and troughs and an imaginary line orthogonal to an optical axis of said illumination lens element, is defined as an inclination angle, said inclination angle is distributed over a range from 0° to ±60° or more; and wherein when said peaks-and-troughs- surface for one period is equidistantly divided by a sufficient number of divisional points, a larger inclination angle is related to an existence of more divisional points.

7. The illumination optical system according to claim 6, wherein said luminous body comprises an exit-end surface of a fiber-optic lightguide for transmitting light rays from a light source.

8. An illumination lens element comprising peaks and troughs which are alternately provided on at least one of an incident surface and an exit surface of said illumination lens element, wherein a cross-sectional shape of said peaks and troughs comprises a curved surface defined by a periodic function which is able to be differentiated, or said peaks and troughs are formed by a plurality of straight lines approximating said curved surface which is able to be differentiated; and wherein said peaks and troughs are rotationally symmetrical with respect to an axis parallel with an optical axis of said illumination lens element.

9. The illumination lens element according to claim 8, wherein said periodic function is a combination of a plurality of periodic functions.

10. An illumination lens element comprising peaks and troughs which are alternately provided on at least one of an incident surface and an exit surface of said illumination lens element, wherein, when an angle, formed by a tangential line with respect to said peaks and troughs and an imaginary line orthogonal to an optical axis of said illumination lens element, is defined as an inclination angle, said inclination angle is distributed over a range from 0° to ±60° or more; and wherein when said peaks-and-troughs surface for one period is equidistantly divided by a sufficient number of divisional points, a larger inclination angle is related to an existence of more divisional points.

11. An illumination lens element comprising periodic peaks and troughs which are provided on at least one of an incident surface and an exit surface of said illumination lens element;

wherein said peaks and troughs are formed so that at least three tangential directions exist in one period; and wherein said peaks and troughs are rotationally symmetrical with respect to an axis parallel with optical axis of said illumination lens element.

* * * * *